United States Patent [19]

Thomas

[11] Patent Number: 4,618,221
[45] Date of Patent: Oct. 21, 1986

[54] ADJUSTABLE RETICLE DEVICE

[76] Inventor: Richard L. Thomas, Rte. 3, Box 369, Wardensville, W. Va. 26851

[21] Appl. No.: 437,069

[22] Filed: Oct. 27, 1982

[51] Int. Cl.$^4$ ............................................. G02B 23/00
[52] U.S. Cl. .................................................... 350/566
[58] Field of Search .................. 350/566, 565; 33/298, 33/246, 248

[56] References Cited

U.S. PATENT DOCUMENTS 2,548,861  4/1951  Brown ................................ 350/565

OTHER PUBLICATIONS

Bushnell, "Running Boar Target Scope" (instruction booklet).
"Herter's Hudson Bay Official Rifle Scope Specs", Outdoor Life, p. 200, Feb. 1963 (Ref. #8).
Maj. George Monte, "Range Finding & Focussing Devices", Gunsight Guide, p. 168 (Ref. #2).

Primary Examiner—John K. Corbin
Assistant Examiner—Vincent J. Lemmo
Attorney, Agent, or Firm—Sughrue, Mion, Zinn, Macpeak, and Seas

[57] ABSTRACT

A telescopic sight having objective lenses, intermediate lenses and an eyepiece is provided with an adjustable reticle device which is disposed in the second focal plane intermediate the eyepiece and said intermediate lenses. The adjustable reticle device is provided with a fixed center line reticle and two identical moveable reticles located on opposite sides of the center line reticle. The moveable reticles are each supported by a carrier which is moveable in two orthogonal directions by means of two threaded stems carried by the body of the adjustable reticle device. The stems are each provided with knurled knobs each of which has two arrows thereon disposed at right angles to each other on the side of knob facing the shooter so that the shooter can readily determine the direction of movement of bullet impact upon rotation of a knob in any specific direction.

6 Claims, 8 Drawing Figures

ADJUSTABLE RETICLE DEVICE

BACKGROUND OF THE INVENTION

The present invention is directed to an adjustable reticle device and more specifically to a dual reticle device wherein each reticle is independently adjustable toward and away from a center line as well as in the up and down direction by means of two separate control knobs for each reticle device.

Such an adjustable reticle device is used in conjunction with a telescopic rifle sight in Running Target marksmanship. International Running Target as a shooting sport began in Scandinavia as a practice for hunters and has evolved into a precise, demanding sport recognized officially by the International Shooting Union. The standard target is a Running Boar which is moved at a fixed speed across a 10 meter opening on a 50 meter range. The use of an adjustable reticle in conjunction with a telescopic sight is acceptable in the sport.

It is generally old and well known in the art to provide some means for adjusting a reticle or reticles vertically and/or horizontally. For example, the U.S. Pat. No. 476,874, to Cummins, granted June 14, 1892, discloses a telescopic rifle sight having thumb-screws GP whereby the globe M is aligned with globe C. The globe M is moved independently of globe C.

The U.S. Pat. No. 1,950,790, to Fjrenwald, granted Mar. 13, 1934, discloses a gun sight having means for moving a single reticle vertically and another means for moving the reticle horizontally.

The U.S. Pat. No. 2,094,623, to Stokey, granted Oct. 5, 1937, discloses a double reticle which is shown in FIG. 10 at 76 and 78. When a missle is sighted, the reticle 76 is moved along the path travelled by the missle and simultaneously the reticle 78 moves in the opposite direction.

The Nickel riflescope was specially developed for use on Running Boar and provides two reticle posts which are individually adjustable in elevation and windage. All telescopic sights have first and second focal planes. The adjustable reticle of Nickel is located in the first focal plane. Since a reticle in this plane will magnify and become larger to the eye as the power is increased in variable power scopes, such an arrangement is objectionable to many shooters.

SUMMARY OF THE INVENTION

The present invention provides a new and improved adjustable reticle device which overcomes the various drawbacks associated with the prior art adjustable reticle devices. In the first place, the reticle device according to the present invention is designed to be placed in the second focal plane of a telescopic sight so that the reticle remains the same size to the eye regardless of the power setting. The present invention provides a plurality of dual reticle designs with the reticles being symmetrically located with respect to a fixed center reticle which tells the shooter while test firing the rifle where the rifle is "zeroed". The fixed reticle is designed to provide a reference point to aid in adjusting the dual reticles up and down as well as in and out. Finally, the present invention locates the knobs for adjusting the dual reticles in a highly visible location so that the shooter may readily view the graduations during adjustment.

The present invention provides a new and improved adjustable reticle device comprising a hollow, substantially rectilinear body having an end wall with a threaded cylindrical aperture therethrough, a fixed reticle member having external threads thereon disposed in threaded engagement with said threaded aperture to locate said fixed reticle in position relative to said body, a pair of reticle carriers located in said body, cover means secured to said body to adjustably hold said carriers within said body, each of said carriers having a pair of orthogonally disposed bores extending therethrough, a pin slideably located in each of said bores, a pair of threaded stems disposed in threaded engagement with each of said pins at right angles thereto, knob means located externally of said body on adjacent sides thereof disposed in operative connection with said stems whereby upon rotation of each knob in opposite directions said reticle carrier will be moved toward and away from the respective wall of said body.

The present invention provides a new and approved adjustable reticle device in combination with a telescopic sight wherein said adjustable reticle device is provided with means for securing said adjustable reticle device in the second focal plane of said telescopic sight and additional means are provided on said adjustable vertical device for securing an ocular assembly.

The foregoing and other objects, features and advantages of the invention will be apparent from the more particular description of a preferred embodiment of the invention as illustrated in the accompanying drawings.

DETAILED DESCRIPTION OF THE INVENTION

Figure 1:
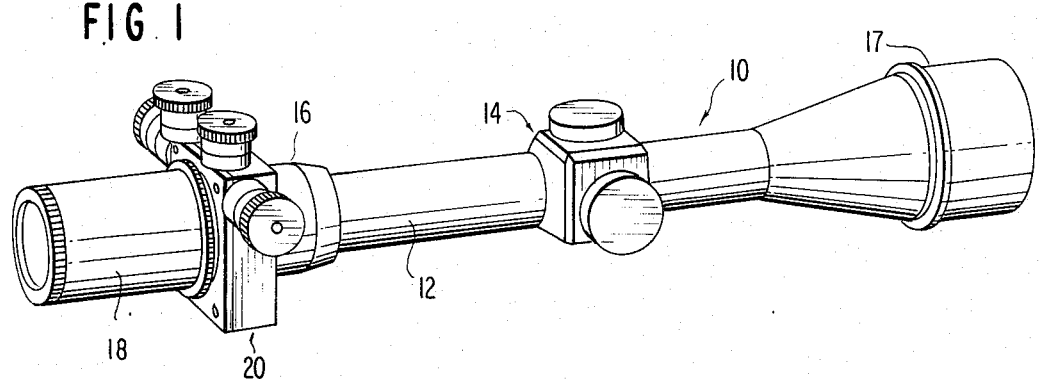
FIG. 1 is a perspective view of a telescopic sight incorporating the adjustable reticle device according to the present invention.

FIG. 1 shows a telescopic sight of the type usable with rifles incorporating the adjustable reticle device according to the present invention.

Figure 4:
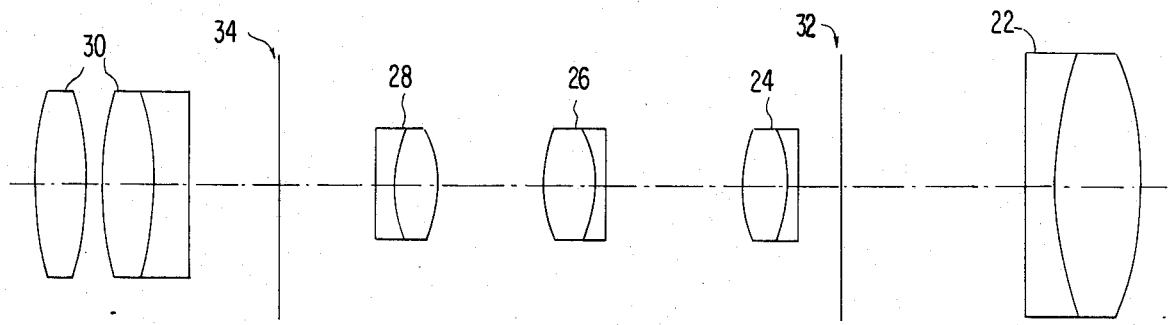
FIG. 4 is a schematic optical diagram of the telescopic sight shown in FIG. 1.

The scope 10 is composed of a hollow cylindrical housing 12 having large diameter end fittings 16 and 17 at either end thereof. The adjustable reticle device 20 according to the present invention is secured to the end of the housing 12 of the scope and an eye piece 18 is secured to the other side of the adjustable reticle device 20. An optical schematic diagram of the lenses is shown in FIG. 4. The objective lens 22 is located in the enlarged end piece 17 and the erector lens 24 is mounted in the cylindrical housing 12 adjacent to the end piece 17. Variable power lenses 26 and 28 are adjustably mounted within the cylindrical housing 12 and adjusting device 14 provides for windage and elevation correction. The ocular lenses 30 are located within the eye piece 18. In the Nickel telescope the reticle device is located in the first focal plane 32. However, as pointed out previously, any reticle located in this plane will magnify and become larger to the eye as the power is increased in the variable power scope. Such a feature is objectionable to many marksmen, and accordingly, the adjustable reticle device according to the present invention is located in the second focal plane 34.

Figure 2:
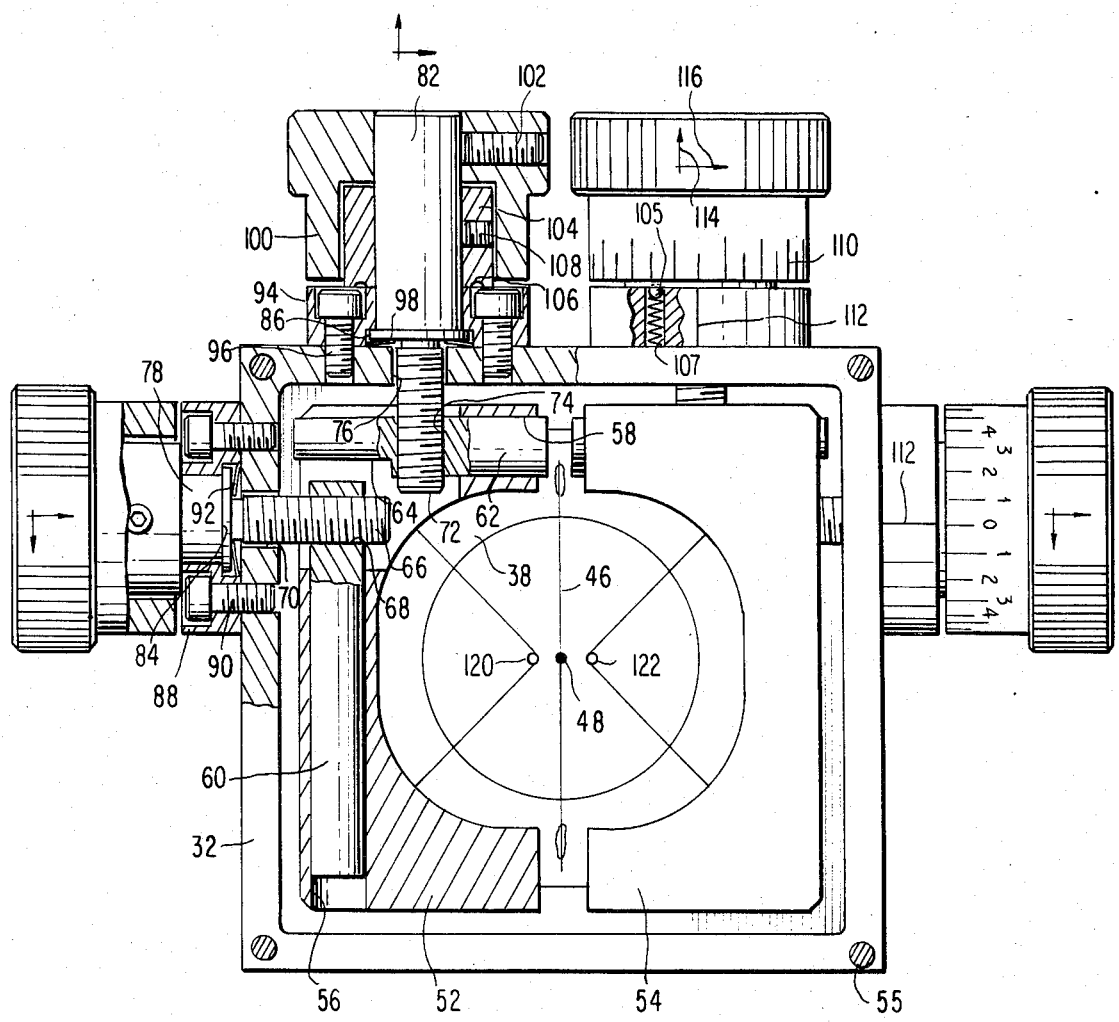
FIG. 2 is an end view, partially in section, of the adjustable reticle device according to the present invention with the cover member removed.
Figure 3:
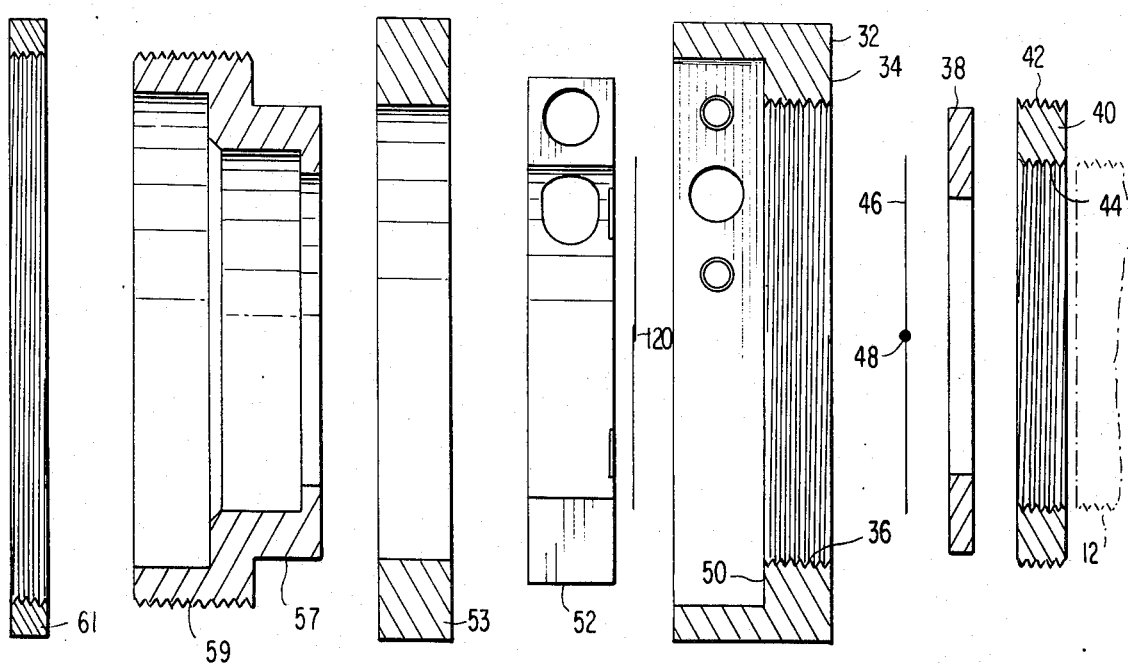
FIG. 3 is an exploded view, partially in section, of the adjustable reticle device according to the present invention.

The detailed construction of the adjustable reticle device according to the present invention is shown in FIGS. 2 and 3. A substantially rectilinear housing 32 is provided with an end wall 34 having a cylindrical threaded aperture 36 extending therethrough. A field stop ring 38 having a central aperture is secured to an annular adapter ring 40 having external threads 42 and internal threads 44. An ultrafine wire or thread 46 is secured to one face of the field stop ring 38 and the opposite face of the field stop ring 38 is secured to the adapter ring 40 by any suitable means such as adhesive or soldering. The thread or wire 46 defines a centerline reticle and a small piece of material 48 on the thread or wire 46 defines a center dot for the center-line reticle. The adapter ring 40 is threaded onto the externally threaded tube 12 and locates the dot reticle 46, 48 in a vertical position exactly in the second focal plane 34. The body 32 is then threaded onto the adapter 40 to bring the moveable reticles into the same plane.

Two substantially "C-shaped" reticle carriers 52 and 54 are located within the body 32 in the manner shown in FIG. 2 to provide a central opening through which the reticles are always visible regardless of the positions of the carriers 52 and 54. Since the two carriers 52 and 54 are mirror images of each other, only the left-hand assembly as viewed in FIG. 2 will be described in detail. The carrier 52 is provided with two bores 56 and 58 which are disposed at right angles to each other with the bore 56 disposed parallel to the center line reticle 46. A pair of cylindrical pins 60 and 62 are slidably located within the bores 56 and 58 respectively. The pin 62 is provided with a notch 64 to provide sufficient clearance for movement of the pin 60 relative to the pin 58. A threaded stem 66 is screwed into the threaded aperture 68 in one end of the pin 60 and extends outwardly of the body 32 through an aperture 70. A similar threaded stem 72 is screwed into a threaded aperture 74 at approximately the mid-point of the pin 62 and extends outwardly of the body 32 through an aperture 76.

The threaded stems 66 and 72 are each provided externally of the body 32 with a larger diameter smooth turning portion 78 and 82 respectively, each of which is provided with a flange 84 and 86 respectively. An annular retaining cap 88 is secured to the body 32 by means of screws 90 for engagement with the flange 84 which is spring biased outwardly by means of an annular spring washer 92. A similar annular retainer 94 is secured to the body 32 by means of screws 96 for engagement with the flange 86 which is biased outwardly by means of a spring washer 98. Thus, the threaded stems 66 and 72 are mounted for rotation relative to the body 32 and the pins into which they are screwed while being substantially restrained against axial movement. A knob 100 is secured to the enlarged cylindrical portion 82 of the stem 72 by means of a set screw 102. A detent plate 104 having a plurality of recesses 106 disposed in a circle on the bottom surface thereof is secured to the enlarged cylindrical portion 82 of the stem 72 by means of the set screw 108. A spring biased ball 105 located in a bore 107 in the upper surface of the retainer 94 is adapted to engage the recesses 106 to provide for a stepped positioning of the rotatable stem. A plurality of graduation marks 110 are provided on each knob for coordination with an index line 112 on the outer surface of a retainer ring 94. A pair of orthogonally disposed arrows 114 and 116 are provided on the knurled outer surface of each knob with the arrow 114 indicating the direction the bullet impact will be moved upon rotation of the knob in the direction of the arrow 116. Rotation of the knob in the opposite direction would necessarily result in movement of the bullet impact in the direction opposite the direction of the arrow 114. The knob and spring biased detent arrangement, as well as the indexing arrangement, is identical for each of the knobs. A pair of loop type reticles 120 and 122 are secured to each carrier 52 and 54 respectively, by any suitable means such as an adhesive, soldering, or the like.

With the adjustable reticle device as shown in FIG. 2 mounted in the scope 10 in FIG. 1 in the manner illustrated, the directional arrowas on each knob will be visible to the shooter as he sights the target through the eye piece 18. Thus, the shooter can readily turn any one of the four knobs to adjust the position of the moveable reticles 120 and 122 relative to the fixed reticle 46, 48. The rotation of each knob will cause the threaded stem associated with that particular knob to rotate in the threaded bore of the respective pin thereby moving the end toward or away from the knob depending on the direction of rotation of the knob. This movement of the pin toward or away from the knob will necessarily move the carrier in which the pin is located to thereby move the reticle.

The telescopic sight may be of fixed power or variable power of any brand suitable for modification to receive the adjustable reticle device. The dot 48 on the ultra-fine center reticle line 46 is provided to assist sighting-in the scope by means of the adjusting device 14 and to provide a reference point for the adjustment of the reticles 120 and 122. The dot 48 and line 46 are very small so they are not conspicuous since they are not used when shooting at the moving target. The fixed center reticle does not necessarily have to be limited to a vertical line with a dot, but could be a cross-hair or any other style reticle. The inside diameter of the ring 38 provides a field stop which is the field of view seen by the shooter. While the fixed reticle is installed in the second focal plane with the moveable reticles, it could also be installed in the first focal plane.

As best seen in the exploded view in FIG. 3, the loop reticle 120 will be secured to the face of the carrier 52 which faces the ring 38. Thus, with the carriers 52 and 54 secured within the body 32 by means of a cover 53 which is secured to the body by means of screws and threaded into tapped holes 55, the fixed reticle 46, 48 and the adjustable reticles 120 and 122 will be located in substantially the same plane facing each other. An ocular assembly connector 57 is secured to the cover 53 by any suitable means and is provided with external threads 59 upon which a knurled lock ring 61 is threaded. The ocular assembly 18 is also adapted to be threaded onto the connector 57. In operation, the knurled lock ring 61 is loosened to allow the ocular lens assembly 18 to be focused on the reticles. The position of the ocular assembly relative to the reticles depends on the individual's eyesight. The ring 61 is then tightened to prevent the assembly from turning. The ocular assembly, also known as the eyepiece, usually contains three or four lenses as shown in FIG. 4 that focus on the second focal plane where the reticles are mounted and the image projected by the objective lens and the erector lenses appears.

The thread pitch on each stem 66 and 72 is determined by the amount of movement that is necessary to correspond with each "click" or graduation on the adjusting knob. An example would be one click moves the reticle about 0.010 inches wich equals about one-quarter of an inch on the target at fifty meters. While the amount of reticle movement remains constant, if installed on a variable powered scope, the movement on the target decreases as the power is increased and increases as the power is decreased. The fit between the threads on the stem and guidepins should be as close as possible or backlash is introduced in the assembly preventing the adjustable reticle carriers from maintaining a constant position. The springs, such as springs 92 and 98, biasing the stems outwardly, apply friction to each stem and remove any tolerance between the stem and counterbore in the associated retainer. The provision of the spring biased ball and detent plate with each knob allows the shooter to make adjustments without reading the graduation on the knob.

Figure 5A:
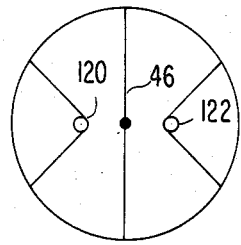
FIGS. 5a–d show four different styles of reticle devices usable with the present invention.
Figure 5B:
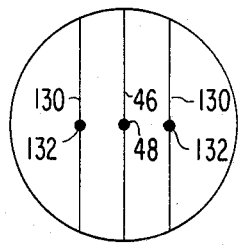
Figure 5C:
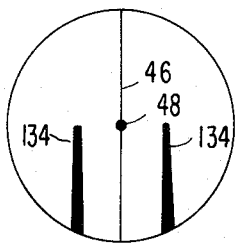
Figure 5D:
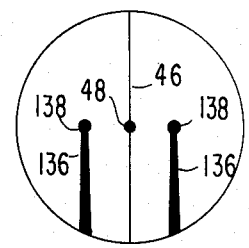

In addition to the adjustable double loop reticle arrangement shown in FIG. 2 and in FIG. 5a, three other forms of adjustable double reticles are shown in FIGS. 5b–d. In each example, a fixed center line reticle 46 having a center dot 48 is provided, but as indicated previously, a fixed reticle may take a number of different forms. In FIG. 5b each adjustable reticle is comprised of the wire or thread 130 disposed parallel to the center line reticle 46 and is provided with a dot 132 at the mid-point thereof. In the embodiment in FIG. 5c a pair of posts 134 constitute the adjustable reticles. Each post is tapered and has a center line essentially parallel to the fixed center line reticle 46. Each post has a height on a level with the dot 48 at the midpoint of its adjustable vertical range. In the embodiment of FIG. 5d a pair of posts 136, each of which is provided with a ball 138 on the upper end thereof, constitute the adjustable reticles. It is obvious that any number of other variations can be provided both for the fixed reticle as well as the adjustable reticles depending upon the preference of the shooter.

While the invention has been particularly shown and described with reference to preferred embodiments thereof, it will be understood by those in the art that the foregoing and other changes in form and details may be made therein without departing from the spirit and scope of the invention.

What is claimed is:

1. An adjustable reticle device comprising a hollow, substantially rectilinear body having an end wall provided with a threaded cylindrical aperture extending therethrough, fixed reticle means adjustably secured in said cylindrical aperture, a pair of reticle carriers moveably disposed in said body each of which has an identical reticle secured thereto adjacent to and coplanar with said fixed reticle means, each of said carriers being spaced apart from each other on opposite sides of said fixed reticle means with each carrier having a pair of orthogonally disposed cylindrical bores extending therethrough, a pin slideably located in each of said bores, a pair of threaded stems disposed in threaded engagement with each of said pins at right angles thereto and extending outwardly of said body, knob means located externally of said body on adjacent sides thereof disposed in operative connection with said stems and retaining means connected to said body for permitting rotation of said stems relative to said body while preventing axial movement of said stems so that each of said reticles attached to a respective carrier can be moved in two directions parallel to said stems independently of each other.

2. An adjustable reticle device as set forth in claim 1 further comprising detent means operatively located between said knob means and said retaining means for permitting stepped adjustment of said knob means and associated stem.

3. An adjustable reticle device as set forth in claim 1 wherein said carriers are spaced apart from each other and said fixed reticle means is comprised of a filament in alignment with the spacing between said carriers having a center dot secured thereto.

4. An adjustable reticle device as set forth in claim 1 further comprising first adapter means secured to said body on one side thereof for attachment to one end of a telescopic sight and second adapter means secured to the opposite side of said body for receiving an eyepiece for said telescopic sight.

5. A telescopic sight comprising a hollow cylindrical tube, objective lens means secured to one end of said tube, an additional lens means located within said tube to define a first focal plane adjacent one end of said tube intermediate said objective lens means and said additional lenses and a second optical plane adjacent the opposite end of said tube, an adjustable reticle device secured to said opposite end of said tube comprised of a fixed reticle means and two identical reticle means coplanar with said fixed reticle means and moveable independently of each other along two paths disposed at right angles to each other on opposite sides of said fixed reticle means and an eye piece having ocular lens means therein secured to said adjustable reticle device for focusing on said reticle means in said second focal plane.

6. A telescopic sight as set forth in claim 5 further comprising fixed reticle means mounted in said adjustable reticle device intermediate said reticle means.

* * * * *